(12) United States Patent
Yasuda

(10) Patent No.: US 6,659,243 B2
(45) Date of Patent: Dec. 9, 2003

(54) SHAFT SEAT PART STRUCTURE OF HYDRAULIC SHOCK ABSORBER AND ASSEMBLING METHOD THEREOF

(75) Inventor: Tsutomu Yasuda, Saitama (JP)

(73) Assignee: Showa Corporation (JP)

(*) Notice: Subject to any disclaimer, the term of this patent is extended or adjusted under 35 U.S.C. 154(b) by 0 days.

(21) Appl. No.: 10/093,224

(22) Filed: Mar. 7, 2002

(65) Prior Publication Data

US 2003/0024780 A1 Feb. 6, 2003

(30) Foreign Application Priority Data

Aug. 2, 2001 (JP) ....................... 2001-235534

(51) Int. Cl.$^7$ ................................. F16F 9/36
(52) U.S. Cl. .................. 188/322.17; 188/322.19
(58) Field of Search .............. 188/322.16, 322.17, 188/322.19

(56) References Cited

U.S. PATENT DOCUMENTS

| | | | | |
|---|---|---|---|---|
| 4,508,020 A | * | 4/1985 | Szcupak | 277/353 |
| 4,542,811 A | * | 9/1985 | Miura | 188/322.17 |
| 4,795,009 A | * | 1/1989 | Tanahashi et al. | 188/315 |
| 4,880,087 A | * | 11/1989 | Janes | 188/322.16 |
| 5,176,229 A | * | 1/1993 | Kanari et al. | 188/322.17 |
| 5,224,573 A | * | 7/1993 | Amemiya et al. | 188/322.17 |
| 5,529,155 A | * | 6/1996 | Jones et al. | 188/322.21 |
| 5,533,598 A | * | 7/1996 | Adrian et al. | 188/322.17 |
| 6,105,739 A | * | 8/2000 | Deppert | 188/322.17 |
| 6,158,559 A | * | 12/2000 | Asa et al. | 188/322.17 |

FOREIGN PATENT DOCUMENTS

| | | | | |
|---|---|---|---|---|
| EP | 0535409 | * | 9/1992 | 188/322.19 |
| JP | 63219931 | | 9/1988 | |
| JP | 406058358 | * | 3/1994 | 188/322.19 |
| JP | 665638 | | 9/1994 | |

* cited by examiner

Primary Examiner—Christopher P. Schwartz
Assistant Examiner—Devon Kramer
(74) Attorney, Agent, or Firm—Orum & Roth

(57) ABSTRACT

In a shaft seal part structure of a hydraulic shock absorber, a diameter of an upper portion of the outer cylinder is reduced toward the tubular portion of the oil seal, and the diameter reduced portion of the outer cylinder presses the tubular portion of the oil seal downward, thereby holding the inner cylinder, the rod guide and the oil seal in an inner portion of the outer cylinder.

17 Claims, 1 Drawing Sheet

SHAFT SEAT PART STRUCTURE OF HYDRAULIC SHOCK ABSORBER AND ASSEMBLING METHOD THEREOF

BACKGROUND OF THE INVENTION

1. Field of the Invention

The present invention relates to a shaft seal part structure of a hydraulic shock absorber and an assembling method of the same.

2. Description of the Related Art

In a hydraulic shock absorber, for example, as described in Japanese Unexamined Utility Model Application Laid-Open No. 6-65638, an inner cylinder is arranged in an inner side of an outer cylinder. A rod guide is arranged in an inner side of the inner cylinder. An oil seal for sealing the inner cylinder and the rod guide is attached in a sealing manner to an inner side of the outer cylinder, and a piston rod is inserted to the inner cylinder via the oil seal and the rod guide.

In the conventional art, the rod guide is attached to an upper end of the inner cylinder. The oil seal which is inserted to an upper inner periphery of the outer cylinder is layered on the rod guide. An upper end of the outer cylinder is bent inward according to a roll caulking. The inner cylinder, the rod guide, and the oil seal are held in an inner portion of the outer cylinder by the bent portion. At this time, an outer peripheral lip of the oil seal is in contact with an inner periphery of the outer cylinder so as to seal the outer cylinder.

The conventional art mentioned above has the following problems.

(1) Since the structure is made such that the outer peripheral lip of the oil seal is in contact with the inner periphery of the outer cylinder so as to seal the outer cylinder, it is necessary to make surface roughness of the outer periphery in the outer cylinder fine. It is also necessary to finish the inner periphery of the outer cylinder to which the oil seal is inserted according to a cutting process or the like.

(2) When inserting the oil seal to the outer cylinder, there is a risk that the outer peripheral lip of the oil seal is damaged because the outer diameter of the outer peripheral lip in the oil seal is larger than the inner diameter of the outer cylinder.

SUMMARY OF THE INVENTION

An object of the present invention is, in a shaft seal part structure of a hydraulic shock absorber, to seal an outer cylinder to which an oil seal is inserted, without finishing an inner periphery of the outer cylinder and while avoiding the risk that damage is generated in an outer peripheral seal portion of the oil seal at a time of inserting the oil seal.

According to the present invention, there is disclosed a shaft seal part structure of a hydraulic shock absorber in which an inner cylinder is arranged in an inner side of an outer cylinder, a rod guide is arranged in an inner side of the inner cylinder, an oil seal for sealing the inner cylinder and the rod guide is attached in a sealing manner to an inner side of the outer cylinder, and a piston rod is inserted to the inner cylinder via the oil seal and the rod guide.

The oil seal is provided with a seal core having a doughnut-like horizontal portion and a tubular portion extending downward from an outer periphery thereof, layered on an upper portion of the inner cylinder via the rod guide.

A diameter of an upper portion of the outer cylinder is reduced toward the tubular portion of the oil seal.

The diameter reduced portion of the outer cylinder presses the tubular portion of the oil seal downward, thereby holding the inner cylinder, the rod guide, and the oil seal in an inner portion of the outer cylinder.

According to the present invention, there is disclosed a method of assembling a shaft seal part structure of a hydraulic shock absorber in which an inner cylinder is arranged in an inner side of an outer cylinder, a rod guide is arranged in an inner side of the inner cylinder, an oil seal for sealing the inner cylinder and the rod guide is attached in a sealing manner to an inner side of the outer cylinder, and a piston rod is inserted to the inner cylinder via the oil seal and the rod guide.

The inner cylinder is arranged in a coaxial manner in an inner side of the outer cylinder by using the oil seal provided with a seal core having a doughnut-like horizontal portion and a tubular portion extending downward from an outer periphery thereof.

The rod guide and the oil seal are layered in an upper end of the inner cylinder.

The diameter of an upper portion of the outer cylinder toward the tubular vertical portion of the oil seal is reduced so as to press the tubular portion of the oil downward by the diameter reduced portion.

According to the present invention, a horizontal direction means a direction orthogonal to a center axis of a piston rod in a hydraulic shock absorber, and a vertical direction means a direction extending along the center axis of the piston rod. An upward direction means a direction in which the piston rod moves out from the hydraulic shock absorber, and a downward direction means a direction in which the piston rod moves.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
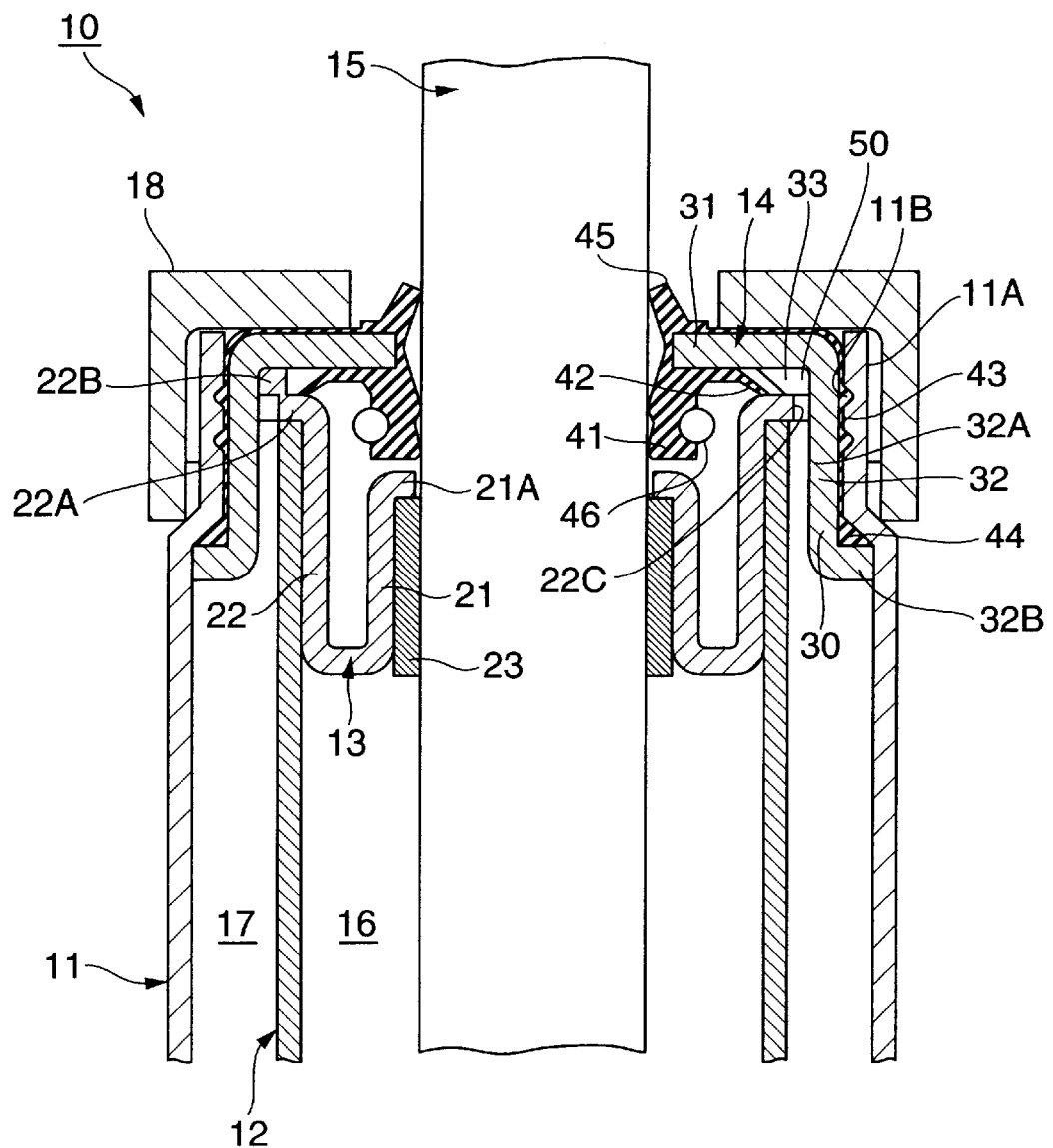
FIG. 1 is a cross sectional view showing a shaft seal part structure of a hydraulic shock absorber.

FIG. 1 shows a shaft seal part of a hydraulic shock absorber 10 to which the present invention is applied. The hydraulic shock absorber 10 is structured such that an inner cylinder 12 is arranged in a coaxial manner in an inner side of an outer cylinder 11. A rod guide 13 is coaxially arranged in an inner side of the inner cylinder 12. An oil seal 14 for sealing the inner cylinder 12 and the rod guide 13 is attached in a sealing manner to the inner side of the outer cylinder 11. A piston rod 15 is inserted to the inner cylinder 12 via the oil seal 14 and the rod guide 13. In the hydraulic shock absorber 10, an inner portion of the inner cylinder 12 is formed as an oil chamber 16, and a portion between the outer cylinder 11 and the inner cylinder 12 is formed as a reservoir chamber 17. An upper portion of the reservoir chamber 17 is formed as a gas chamber.

The hydraulic shock absorber 10 is used, for example, to connect the outer cylinder 11 to a side of an axle and to connect the piston rod 15 to a side of a vehicle body. When an impact applied to the vehicle is absorbed on the basis of a compression and expansion deformation of a suspension spring (not shown), the hydraulic shock absorber 10 oscillates a piston (not shown) fixed to an insertion end of the piston rod 15 to the inner cylinder 12 in an inner portion of an oil chamber 16. This reduces a compressing and expanding vibration of the suspension spring due to a damping force generated by a damping force generating apparatus provided in the piston. An excess and deficiency of an oil amount in the inner portion of the inner cylinder 12 caused by a forward movement and a backward movement of the piston rod 15 with respect to the inner cylinder 12 is compensated between the inner cylinder 12 and a lower oil chamber of a reservoir chamber 17.

The hydraulic shock absorber 10 employs a rod guide 13 obtained by press molding a sheet metal. The rod guide 13 has an outer tube portion 22 formed by folding back a lower end portion of an inner tube portion 21. The rod guide is provided with a bush 23 by pressure inserting the bush 23 to a lower portion of a flange portion 21A protruding from an upper end of the inner tube portion 21 to an inner side in a diametrical direction. The rod guide 13 puts a lower surface of a flange portion 22A protruding from an upper end of the outer tube portion 22 to an outer side in the diametrical direction on an upper end of the inner cylinder 12, forms protruding portions 22B protruding upward at a plurality of positions in a peripheral direction of the flange portion 22A, and brings the protruding portions 22B into contact with a lower surface of a seal core 30, mentioned below, of the oil seal 14.

The hydraulic shock absorber 10 is provided with a doughnut-like horizontal portion 31 and a seal core 30 having a tubular portion 32 extending downward from an outer periphery thereof, as the oil seal 14. The tubular portion 32 is constituted by a tubular vertical portion 32A suspended from an outer periphery of the horizontal portion 31, and a flange portion 32B protruding from a lower end thereof to an outer side in a diametrical direction, in the present embodiment. The oil seal 14 is continuously provided with an oil seal lip portion 41, a check lip portion 42, an outer peripheral seal portion 43, an outer peripheral lip portion 44, and a dust lip portion 45 in the seal core 30. These elements may be made of an NBR (acrylonitrile-butadiene rubber), respectively, according to a printing formation. A ring-like spring 46 is fastened to a back surface of the oil seal lip portion 41. The oil seal lip portion 41 and the check lip portion 42 are provided on a lower surface of the horizontal portion 31. The outer seal portion 43 is provided on an outer surface of the tubular vertical portion 32A. The outer lip portion 44 is provided in an upper portion of the flange portion 32B, and the dust lip portion 45 is provided on an upper surface of the horizontal portion 31.

The shaft seal part of the hydraulic shock absorber 10 is assembled in the following manner.

(1) The inner cylinder 12 is arranged in a coaxial manner, in the inner side of the outer cylinder 11.

(2) The rod guide 13 is inserted and attached to the upper end of the inner cylinder 12, and the outer peripheral flange portion 22A of the rod guide 13 is put on the upper end of the inner cylinder 12. Further, the oil seal 14 is inserted to the upper end of the outer cylinder 11 with a clearance, and the horizontal portion 31 of the oil seal 14 is layered on the protruding portion 22B of the outer flange portion 22A in the rod guide 13.

(3) The upper portion of the outer cylinder 11 is worked so as to reduce a diameter thereof (sideward caulked) toward the tubular vertical portion 32A of the seal core 30 in the oil seal 14 and the outer peripheral seal portion 43 on the outer surface thereof. The inner cylinder 12, the rod guide 13 and the oil seal 14 are held in the inner portion of the outer cylinder 11 by downward pressing the flange portion 32B of the oil seal 14 and the outer peripheral lip portion 44 in the upper portion thereof by the lower end of the reduced diameter portion 11A. Accordingly, the inner periphery of the diameter reduced portion 11A in the outer cylinder 11 applies the compression force to the outer peripheral seal 43 in an outer periphery of the tubular vertical portion 32A in the oil seal 14 to create a close attachment, and the lower end of the diameter reduced portion 11A applies the compression force to the outer peripheral lip portion 44 in the upper portion of the flange portion 32B in the oil seal 14 so as to closely attach, whereby the outer cylinder 11 is sealed.

(4) A bump stopper cap 18 can be pressure inserted and mounted to the outer periphery of the diameter-reduced portion 11A in the outer cylinder 11.

The diameter reducing work for forming the diameter reduced portion 11A in the upper portion of the outer cylinder 11 is carried out, in one embodiment, by using a press machine (a side caulking machine). A plurality of pressing elements are separately arranged on the outer periphery of the outer cylinder 11 and are simultaneously urging forward a plurality of pressing elements so as to plastically deform the outer periphery of the outer cylinder 11 all the area in a peripheral direction in such a manner as to reduce the diameter.

The oil seal 14 sealed in the shaft seal part of the hydraulic shock absorber 10 functions in the following manner.

(1) The oil seal lip portion 41 is in contact with the piston rod 15 in a sliding manner, with a predetermined fastening margin so as to prevent oil leakage from the oil chamber 16 of the inner cylinder 12.

(2) The seal core 30 is provided with a convex portion 33 downward protruding to a plurality of positions in a peripheral direction of a crossing corner portion between the doughnut-like horizontal portion 31 and the tubular vertical portion 32A. The convex portion 33 is brought into contact with the upper surface of the outer peripheral flange portion 22A of the rod guide 13, and an oil return passage 50 is formed by a space between the adjacent convex portions 33 in the peripheral direction and a notch portion 22C provided so as to correspond to the space in the peripheral direction of the outer flange portion 22A in the rod guide 13. Accordingly, the piston rod 15 returns the oil swept up to a back side of the rod guide 13 from the oil chamber of the inner cylinder 12 via the inner surface of the bush 23, to the reservoir chamber 17 from the oil return passage 50 mentioned above, via the check lip portion 42 pushed and opened due to the hydraulic pressure.

(3) The check lip portion 42 is closely attached to the upper surface of the outer peripheral flange 22A in the rod guide 13 due to gas pressure of the reservoir chamber 17 applied via the oil return passage 50 mentioned above, thereby preventing gas leakage from the reservoir chamber 17 to the oil chamber 16 of the inner cylinder 12.

(4) The outer peripheral seal portion 43 and the outer peripheral lip portion 44 are closely attached to the inner periphery of the diameter reduced portion 11A of the outer cylinder 11 and lower end of the diameter reduced portion 11A so as to seal the outer cylinder 11, thereby preventing gas leakage from the reservoir chamber 17.

(5) The dust lip portion 45 is in contact with the piston rod 15 in a sliding manner, with the predetermined fastening margin, thereby preventing dust, dirt water or the like from intruding into the oil chamber 16 of the inner cylinder 12.

In this case, in the hydraulic shock absorber 10, it is possible to form one or more annular grooves 11B in the peripheral direction of the portion closely attached to the outer peripheral seal portion 43 of the oil seal 14, in the inner periphery of the diameter reduced portion 11A of the outer cylinder 11. The structure is made such as to seat the seal member of the outer peripheral seal portion 43 compressed due to the diameter reducing work of the outer cylinder 11 into the inner portion of the annular groove 11B to be charged, such that it is possible to more securely seal the outer cylinder 11.

According to the present embodiment, the following operations can be obtained.

(1) The diameter reduced portion 11A of the outer cylinder 11 presses downward the tubular portion 32 of the oil seal 14, thereby holding the inner cylinder 12, the rod guide 13 and the oil seal 14 in the inner portion of the outer cylinder 11, to constitute the shaft seal part of the hydraulic shock absorber 10.

(2) The inner periphery of the diameter reduced portion 11A in the outer cylinder 11 applies the compression force to the outer peripheral seal member (the outer seal portion 43 and the outer peripheral lip portion 44) of the tubular portion 32 in the oil seal 14 to allow close attachment, such that it is possible to seal the outer cylinder 11 without finishing the inner periphery of the outer cylinder 11.

(3) When inserting the oil seal 14 to the outer cylinder 11, it is possible to make the outer diameter of the outer peripheral seal member (the outer peripheral seal portion 43 and the outer peripheral lip portion 44) in the oil seal 14 smaller than the inner diameter of the outer cylinder 11. In this way, there is a reduction in the possibility of damage generated in the outer peripheral seal member (the outer peripheral seal member 43 and the outer peripheral lip portion 44) in the oil seal 14. It is possible to charge gas into the inner portion of the outer cylinder 11 due to the clearance between the outer cylinder 11 and the oil seal 14 before the diameter is reduced in a sealing manner. In this manner it is possible to improve gas sealing properties.

(4) Since the annular groove 11B is formed in the inner periphery of the diameter reduced portion 11A in the outer cylinder 11, it is possible to seat the outer peripheral seal member (the outer peripheral seal portion 43) of the oil seal 14 compressed due to the diameter reduction of the outer cylinder 11 into the inner portion of the annular groove 11B. This makes is possible to more securely seal the outer cylinder 11.

(5) Since the tubular portion 32 of the oil seal 14 is constituted by the tubular vertical portion 32A and the flange portion 32B, it is possible to more securely press the tubular portion 32 of the oil seal 14 downward by reducing the diameter toward the tubular vertical portion 32A of the upper oil seal 14 in the outer cylinder 11, and collide and align the lower end of the diameter reduced portion 11A in the outer cylinder 11 with the flange portion 32B of the oil seal 14.

(6) When the shaft seal part of the hydraulic shock absorber 10 is assembled, it is possible to seal the outer cylinder 11 without finishing the inner periphery of the outer cylinder 11 to which the oil seal 14 is inserted while reducing the possibility that the outer peripheral seal portion 43 is damaged when the oil seal 14 is inserted.

Embodiments of the present invention have been described in detail with reference to the drawings. However, the specific configurations of the present invention are not limited to the embodiments, but those having a modification of the design within the range of the present invention are also included in the present invention. For example, the tubular portion of the seal core constituting the oil seal is not limited to the straight tubular portion 32 with the flange formed by the tubular vertical portion 32A and the flange portion 32B. It may be constituted by a taper-like tubular portion having a diameter expanded downward from the doughnut-like horizontal portion, in which the diameter reduced portion of the outer cylinder presses the taper-like tubular portion downward by forming the upper portion of the outer cylinder in a taper shape so as to reduce the diameter toward the taper-like tubular portion.

The rod guide is not limited to a press-molded product, and may be constituted by a sinter-molded product or the like.

As mentioned above, according to the present invention, in the shaft seal part of the hydraulic shock absorber, it is possible to seal the outer cylinder without finish machining of the inner periphery of the outer cylinder, to which the oil seal is inserted. At the same time, the possibility that the outer peripheral seal portion is damaged at a time of inserting the oil seal is reduced.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, the oil seal being provided with a seal core having a doughnut-like horizontal portion and a tubular portion extending downward from an outer periphery thereof being layered on an upper portion of the inner cylinder via the rod guide, the outer cylinder having an integral upper portion, a diameter of the upper portion of the outer cylinder being reduced toward the tubular portion of the oil seal, an inner periphery of the diameter reduced portion in the outer cylinder being closely attached to a seal member attached to the outer periphery of the tubular portion in the oil seal, and an annular groove is formed in a peripheral direction of a portion closely attached to the seal member of the tubular portion in the oil seal, where the diameter reduced portion of the outer cylinder presses the tubular portion of the oil seal downward, thereby holding the inner cylinder, the rod guide and the oil seal in an inner portion of the outer cylinder, wherein the outer cylinder is sealed.

2. A shaft seal part structure of a hydraulic shock absorber as claimed in claim 1, wherein the tubular portion of the oil seal comprises a tubular vertical portion suspended down from the outer periphery of the doughnut-like horizontal portion and a flange portion protruding outward in a diametrical direction from a lower portion thereof.

3. A shaft seal part structure of a hydraulic shock absorber as claimed in claim 1, wherein a bump stopper cap is pressure inserted to an outer periphery of the diameter reduced portion in the outer cylinder.

4. A shaft seal part structure of a hydraulic shock absorber as claimed in claim 2, wherein the seal member attached to the outer periphery of the tubular portion in the oil seal is provided in the outer surface of the tubular vertical portion and the upper portion of the flange portion.

5. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piton rod being inserted to the inner cylinder via the oil seal and the rod guide, the oil seal being provided with a seal core having a doughnut-like horizontal portion and a tubular portion extending downward from an outer periphery thereof being layered on an upper portion of the inner cylinder via the rod guide, the outer cylinder having an integral upper portion, and a diameter or the upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, and wherein the tubular portion of the oil seal comprises by a tubular vertical portion suspended down from the outer periphery of the doughnut-like horizontal portion and a flange portion protruding outward in a diametrical direction from a lower portion thereof.

6. A shaft seal part structure of a hydraulic shock absorber as claimed in claim 5, wherein a seal member attached to the outer periphery of the tubular portion in the oil seal is provided in the outer surface of the tubular vertical portion and the upper portion of the flange portion.

7. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, and the oil seal being provided with a seal core having a doughnut-like horizontal portion and a tubular portion extending downward from an outer periphery thereof being layered on an upper portion of the inner cylinder via the rod guide, the outer cylinder having an integral upper portion, a diameter of the upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, an inner periphery of the diameter reduced portion in the outer cylinder being closely attached to a seal member attached to the outer periphery of the tubular portion in the oil seal, the tubular portion of the oil seal comprises a tubular vertical portion suspended down from the outer periphery of the doughnut-like horizontal portion and a flange portion protruding outward in a diametrical direction from a lower portion thereof, and wherein the outer cylinder is sealed.

8. A shaft seal part structure of a hydraulic shock absorber as claimed in claim 7, wherein the seal member attached to the outer periphery of the tubular portion in the oil seal is provided in the outer surface of the tubular vertical portion and the upper portion of the flange portion.

9. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, the oil seal being provided with a seal core having a doughnut-like horizontal portion and a tubular portion extending downward from an outer periphery thereof being layered on an upper portion of the inner cylinder via the rod guide, the outer cylinder having an integral upper portion, and a diameter of the upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, and wherein the tubular portion is formed in a taper shape in which a diameter is expanded downward from the doughnut-like horizontal portion, and the diameter reduced portion of the outer cylinder presses the taper-like tubular portion downward by working the upper portion of the outer cylinder, so as to be formed in a taper shape toward the taper-like tubular portion.

10. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, the oil seal being provided with a seal core having a doughnut-like horizontal portion and a tubular portion extending downward from an outer periphery thereof being layered on an upper portion of the inner cylinder via the rod guide, and a diameter of an upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, an inner periphery of the diameter reduced portion in the outer cylinder being closely attached to a seal member attached to the outer periphery of the tubular portion in the oil seal, and an annular groove is formed in a peripheral direction of a portion closely attached to the seal member of the tubular portion in the oil seal, and wherein the outer cylinder is sealed.

11. A shaft seal part structure of a hydraulic shock absorber as claimed in claim 10 wherein the tubular portion of the oil seal comprises a tubular vertical portion suspended down from the outer periphery of the doughnut-like horizontal portion and a flange portion protruding outward in a diametrical direction from a lower portion thereof.

12. A shaft seal part structure of a hydraulic shock absorber as claimed in claim 11, wherein the seal member attached to the outer periphery of the tubular portion in the oil seal is provided in the outer surface of the tubular vertical portion arid the upper portion of the flange portion.

13. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, the oil seal being provided with a seal core having a doughnut-like horizontal portion and a tubular portion extending downward from an outer periphery thereof being layered on an upper portion of the inner cylinder via the rod guide, and a diameter of an upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, and wherein the tubular portion of the oil seal comprises by a tubular vertical portion suspended down from the outer periphery of the doughnut-like horizontal portion and a flange portion protruding outward in a diametrical direction from a lower portion thereof.

14. A shaft seal part structure of a hydraulic shock absorber as claimed in claim 13, wherein a seal member attached to the outer periphery of the tubular portion in the oil seal is provided in the outer surface of the tubular vertical portion and the upper portion of the flange portion.

15. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, and the oil seal being provided with a seal core having a doughnut-like horizontal portion and a tubular portion extending downward from an outer periphery thereof being layered on an upper portion of the inner cylinder via the rod guide, a diameter of an upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, an inner periphery of the diameter reduced portion in the outer cylinder being closely attached to a seal member attached to the outer periphery of the tubular portion in the oil seal, the tubular portion of the oil seal comprises a tubular vertical portion suspended down from the outer periphery of the doughnut-like horizontal portion and a flange portion protruding outward in a diametrical direction from a lower portion thereof, and wherein the outer cylinder is sealed.

16. A shaft seal part structure of a hydraulic shock absorber as claimed in claim 15, wherein the seal member attached to the outer periphery of the tubular portion in the oil seal is provided in the outer surface of the tubular vertical portion and the upper portion of the flange portion.

17. A shaft seal part structure of a hydraulic shock absorber in which an inner cylinder being arranged in an inner side of an outer cylinder, a rod guide being arranged in an inner side of the inner cylinder, an oil seal for sealing the inner cylinder and the rod guide being attached in a sealing manner to an inner side of the outer cylinder, and a piston rod being inserted to the inner cylinder via the oil seal and the rod guide, the oil seal being provided with a seal core having a doughnut-like horizontal portion and a tubular portion extending downward from an outer periphery thereof being layered on an upper portion of the inner cylinder via the rod guide, and a diameter of an upper portion of the outer cylinder being reduced toward the tubular portion of the oil seal, where the diameter reduced portion of the outer cylinder presses the tubular portion of the oil seal downward, thereby holding the inner cylinder, the rod guide and the oil seal in an inner portion of the outer cylinder, and wherein the tubular portion is formed in a taper shape in which a diameter is expanded downward from the doughnut-like horizontal portion, and the diameter reduced portion of the outer cylinder presses the taper-like tubular portion downward by working the upper portion of the outer cylinder, so as to be formed in a taper shape toward the taper-like tubular portion.

* * * * *